US012617250B2

(12) United States Patent
Schneck et al.

(10) Patent No.: US 12,617,250 B2
(45) Date of Patent: May 5, 2026

(54) ELASTOCALORIC HEAT PUMP AND MOTOR VEHICLE COMPRISING ELASTOCALORIC HEAT PUMP

(71) Applicant: Volkswagen Aktiengesellschaft, Wolfsburg (DE)

(72) Inventors: Christian Schneck, Braunschweig (DE); Sergej Kujat, Varrel (DE); Matthias Tonn, Wolsdorf (DE); Konstantin Novgorodov, Wolfenbüttel (DE); Jürgen Olfe, Volkse (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 204 days.

(21) Appl. No.: 18/747,893

(22) Filed: Jun. 19, 2024

(65) Prior Publication Data

US 2024/0424853 A1 Dec. 26, 2024

(30) Foreign Application Priority Data

Jun. 21, 2023 (DE) .......................... 102023205828.6

(51) Int. Cl.
B60H 1/00 (2006.01)
F25B 23/00 (2006.01)

(52) U.S. Cl.
CPC ......... B60H 1/00007 (2013.01); F25B 23/00 (2013.01)

(58) Field of Classification Search
CPC .......... B60H 1/0007; B60H 1/32; B60H 1/14; F25B 23/00; F25B 30/00
See application file for complete search history.

(56) References Cited

U.S. PATENT DOCUMENTS

| | | | |
|---|---|---|---|
| 11,204,189 B2 | 12/2021 | Sharar et al. | |
| 2020/0049389 A1 | 2/2020 | Wuest | |

FOREIGN PATENT DOCUMENTS

| | | | | |
|---|---|---|---|---|
| CN | 111854222 A | | 10/2020 | |
| CN | 115339364 A | * | 11/2022 | .............. F25B 23/00 |
| DE | 102018200376 A1 | | 7/2019 | |
| DE | 102018213497 A1 | | 2/2020 | |
| DE | 102020002845 A1 | | 4/2021 | |

(Continued)

OTHER PUBLICATIONS

CN_115339364_A translation.*

(Continued)

*Primary Examiner* — Elizabeth J Martin
(74) *Attorney, Agent, or Firm* — Peter Zura; LOZA & LOZA, LLP

(57) ABSTRACT

An elastocaloric heat pump including at least one first cooling medium channel, at least one second cooling medium channel, at least one elastocaloric element, and a drive device. The elastocaloric element is positioned between the first and second cooling medium channels and connected at each end to a carriage. The carriages are displaceably arranged on two guide means that are not parallel to each other. The drive device is configured to cyclically displace the carriages along the guide means, thereby alternately bringing the elastocaloric element into thermal contact with an outer wall of the first cooling medium channel and an outer wall of the second cooling medium channel. This configuration satisfies high leak tightness requirements and achieves high efficiency.

20 Claims, 4 Drawing Sheets

(56) References Cited

FOREIGN PATENT DOCUMENTS

| | | | | |
|---|---|---|---|---|
| DE | 102020207876 | A1 | | 12/2021 |
| DE | 102021203852 | A1 | | 10/2022 |
| DE | 102021209740 | A1 * | 3/2023 | .............. F25B 23/00 |

OTHER PUBLICATIONS

DE_102021209740_A1 translation.*
Priority German Application No. 102023205828.6. Search Report (Feb. 12, 2024).

* cited by examiner

ELASTOCALORIC HEAT PUMP AND MOTOR VEHICLE COMPRISING ELASTOCALORIC HEAT PUMP

RELATED APPLICATIONS

The present application claims priority to German Pat. App. No. DE 10 2023 205 828.6, filed Jun. 23, 2021, to Schneck et al., the contents of which is incorporated by reference in its entirety herein.

TECHNICAL FIELD

The present disclosure relates to an elastocaloric heat pump, comprising at least one first cooling medium channel, at least one second cooling medium channel, and at least one elastocaloric element.

The present disclosure furthermore relates to a motor vehicle comprising an elastocaloric heat pump.

BACKGROUND

Elastocaloric heat pumps can be used to increase the efficiency of heat pumps, for example in motor vehicles. The elastocaloric effect is utilized in an elastocaloric heat pump, wherein a reversible temperature change is caused by a cyclical deformation of the elastocaloric material, which can be utilized for the transfer of heat from a cooler coolant flow to a warmer coolant flow.

A device for heat exchange is known from DE 10 2018 200 376 A1, wherein the device comprises elastocaloric ribbons made of elastocaloric material and heat conducting elements for the heat exchange, wherein the heat conducting elements are designed so that a biconvex section of a heat conducting element engages in at least one elastocaloric ribbon, deforming the same, so that an elastocaloric effect is achieved, and heat conduction takes place between the at least one elastocaloric ribbon and the biconvex section of the heat conducting element, and a planar section of a further heat conducting element, in the undeformed state of the elastocaloric ribbon, is in contact with the same so that heat is conducted between the planar section of the further heat conducting element and the at least one elastocaloric ribbon.

DE 10 2018 213 497 A1 discloses a heat exchange means, which is configured to surround a fluid line guiding a heat transport fluid. The means comprises at least one elastocaloric element, which is connected to the fluid line, at least one actuator, which acts on the elastocaloric element and is configured, when actuated, to exert a force on the at least one elastocaloric element so as to deform the at least one elastocaloric element, and at least one fastening element, which is configured to fasten the heat exchange means to the fluid line.

DE 10 2021 209 740 A1 discloses a heat pump comprising an elastocaloric element, a first coolant channel on a cold side for a first coolant flow and a second coolant channel on a hot side for a second coolant flow, a first drive element and a second drive element, wherein the elastocaloric element is clamped on both sides between the first drive element and the second drive element, wherein the first drive element and the second drive element are designed to cyclically move the elastocaloric element back and forth between the first coolant channel and the second coolant channel and to cyclically deform the elastocaloric element.

A cooling method using an elastocaloric material is known from U.S. Pat. No. 11,204,189 B2.

Elastocaloric heat pumps which transfer thermal energy from a cooler gaseous or liquid cooling medium to a warmer gaseous or liquid cooling medium must satisfy high leak tightness requirements to prevent the cooling media from leaking. Moreover, an especially large surface must be provided for the elastocaloric element, in particular in the case of cooling media that have a low coefficient of heat conductivity so as to ensure sufficient heat transfer. This poses high requirements on the shape and thus the producibility of the elastocaloric element. Due to direct contact with the cooling medium, this being water, this water can condense on the elastocaloric element, which possibly evaporates again on the hot side and is thereby taken up by the warm air. As a result, dehumidification must be additionally provided for in such heat pumps.

SUMMARY

Aspects of the present disclosure are directed to providing an elastocaloric heat pump that satisfies high leak tightness requirements and has a high efficiency.

In some examples, an elastocaloric heat pump is disclosed, comprising at least one first cooling medium channel, at least one second cooling medium channel, at least one elastocaloric element, and a drive device, wherein the at least one elastocaloric element is arranged between a first cooling medium channel and a second cooling medium channel and connected at each end to a carriage, wherein the carriages are displaceably arranged at two guide means that are not arranged parallel to one another. The drive device is configured to cyclically displace the carriages along the guide means so that the at least one elastocaloric element is alternately brought in thermal contact with an outer wall, in particular with a contact region of an outer wall, of the first cooling medium channel and in thermal contact with an outer wall, in particular with a contact region of an outer wall, of the second cooling medium channel.

In some examples, a motor vehicle is disclosed, comprising an elastocaloric heat pump described herein.

DESCRIPTION OF THE DRAWINGS

Aspects of the present disclosure will be described in greater detail hereafter based on the accompanying figures. In the drawings.

DETAILED DESCRIPTION

Figure 1:
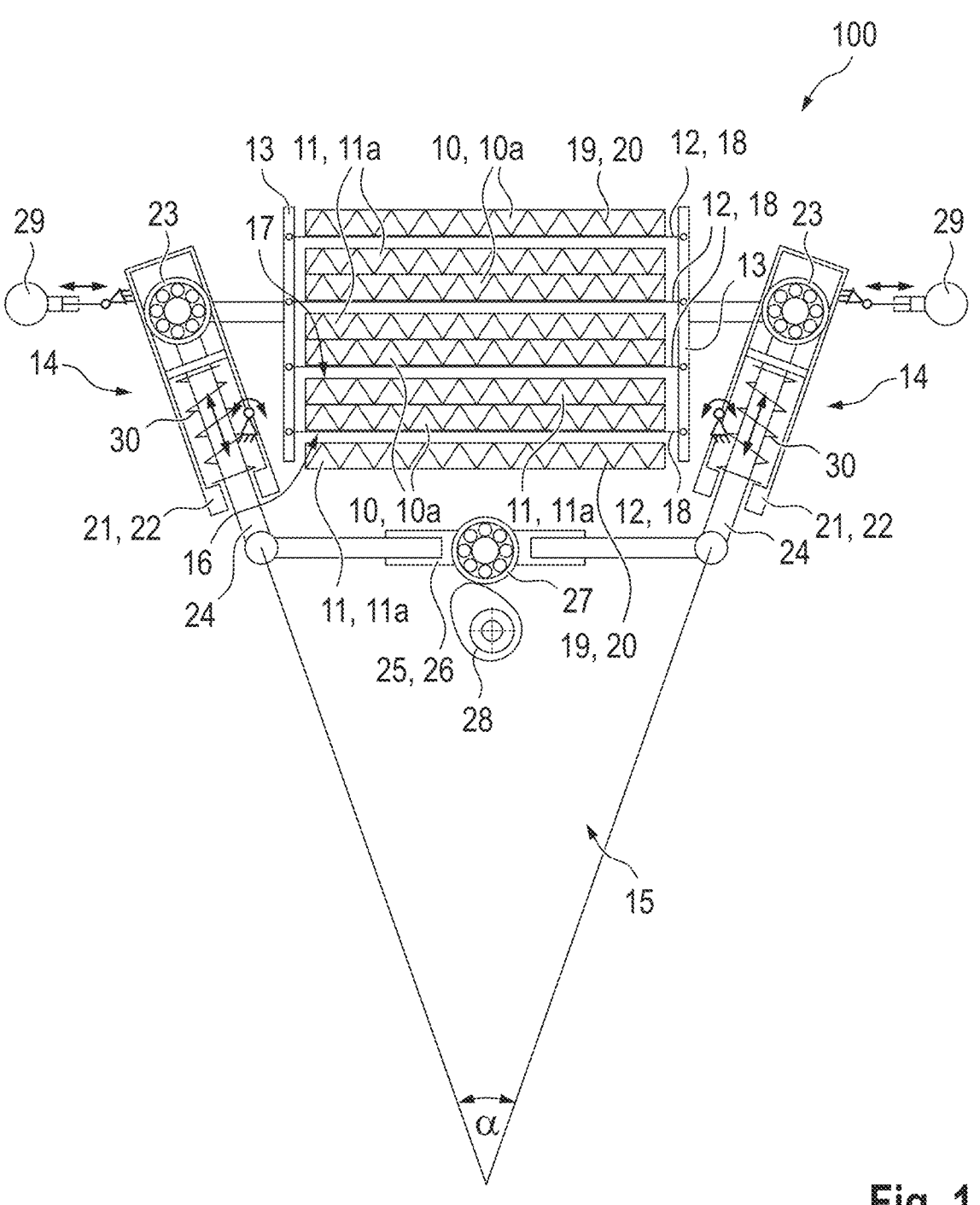
FIG. 1 shows an elastocaloric heat pump, according to some aspects of the present disclosure.

In the figures, identical or corresponding parts are denoted by like reference numerals.

As disclosed herein, a cooling medium may be conducted in the first cooling medium channel and the second cooling medium channel. The cooling medium can be a fluid, particularly a gaseous cooling medium and/or a liquid cooling medium. The cooling medium can also be designed as a coolant, such as water or air.

The at least one elastocaloric element is arranged between the first and second cooling medium channels and is connected at each end to a carriage, providing two carriages. The drive device cyclically displaces the carriages along two guide means that are not parallel to each other. This arrangement allows the elastocaloric element to alternately make thermal contact with an outer wall, particularly a contact region of an outer wall, of the first cooling medium channel and the second cooling medium channel. This thermal contact is typically a physical contact. Through alternating thermal contact, heat is transferred from the elastocaloric element to the first cooling medium channel, specifically to the cooling medium in the first cooling medium channel, and from the second cooling medium channel, specifically from the cooling medium in the second cooling medium channel, to the elastocaloric element.

Since the elastocaloric element is in thermal contact with the outer walls of both the first and second cooling medium channels, it does not directly contact the cooling medium inside these channels. This configuration meets high leak tightness requirements and reduces the risk of corrosion for the elastocaloric element. Additionally, high heat transfer and efficiency can be achieved by appropriately selecting the material for the first and second cooling medium channels.

The first and second cooling medium channels are preferably made of a material with a high coefficient of heat conductivity, at least in the outer wall region and more preferably in the contact region of the outer wall. Suitable materials include metals such as copper or aluminum.

Due to the high thermal conductivity of the material in the first and second cooling medium channels, especially in the contact region of the outer wall, heat is efficiently conducted to the cooling medium.

The drive device cyclically displaces the carriages along the non-parallel guide means. As the guide means are not parallel, the distance between the carriages changes cyclically, increasing and decreasing. This cyclical movement generates restoring forces that support the displacement and return the carriages to their starting position.

For instance, the at least one elastocaloric element can be cyclically strained due to the change in distance between the carriages. Strain refers to stretching (positive length change) and/or compression (negative length change).

As a result of the cyclic strain during displacement, the elastocaloric element heats and cools via the elastocaloric effect, facilitating heat transport between the first and second cooling medium channels.

In a strained state, the elastocaloric element has a material restoring force that counteracts the strain. Because the guide means are not parallel, these restoring forces also have a component along the guide means, providing the restoring force. Additionally, a spring could be attached between the carriages to compress or stretch during the carriages' cyclical displacement along the non-parallel guide means.

The first and second cooling medium channels can be aligned at a right angle to the main extension direction of the elastocaloric element, which preferably corresponds to the direction of strain.

The first cooling medium channel can serve as a hot channel, and the second cooling medium channel can serve as a cold channel. During heat pump operation, heat is transferred from the second cooling medium channel (cold) to the first cooling medium channel (hot).

In some examples, several first and second cooling medium channels and elastocaloric elements are provided, with each elastocaloric element arranged between a first and second cooling medium channel and connected at each end to a carriage.

This configuration allows for multiple first and second cooling medium channels arranged parallel to each other, with each elastocaloric element situated between a first and second cooling medium channel.

Displacing the carriages along the non-parallel guide means alternately brings each elastocaloric element into thermal contact with a first and second cooling medium channel.

In some examples, the elastocaloric element is an elastocaloric ribbon, particularly an elastocaloric flat ribbon. The main extension direction of the elastocaloric element, designed as an elastocaloric ribbon or flat ribbon, corresponds to the direction of its largest extent.

In some examples, the first and second cooling medium channels are thermally insulated outside the outer wall, particularly outside the contact region. The channels can be thermally insulated from each other and the environment, possibly with a coating or plastic enclosure.

In some examples, the first and second cooling medium channels include heat transfer structures, such as ribs. These structures, situated inside the cooling medium channels, increase the contact surface for the cooling medium, enhancing heat exchange, particularly for cooling media with low heat conductivity, like air.

In some examples, the elastocaloric element in thermal contact with the outer wall of the first cooling medium channel is strained, either stretched or compressed. The elastocaloric element is strained while in thermal contact with the outer wall, particularly the contact region, of the first cooling medium channel.

In some examples, the elastocaloric element in thermal contact with the outer wall, particularly the contact region, of the second cooling medium channel is not strained, meaning not stretched or compressed.

In some examples, the elastocaloric element is at least partly strained during the displacement of the carriages along the non-parallel guide means. The cyclical distance change between the carriages during displacement strains the elastocaloric element. This strain or compression is generated by the non-parallel guide means, facilitating heat transfer from the second to the first cooling medium channel.

In some examples, the outer wall of the first cooling medium channel, particularly the contact region, is convexly arched, causing the elastocaloric element to strain upon contact. This geometry strains the elastocaloric element in addition to the strain caused by the carriage displacement along the non-parallel guide means. A convexly arched outer wall allows the elastocaloric element to nestle against it, achieving a large overlap and additional strain.

If the outer wall's curvature radius is large, only a small portion of the elastocaloric element's strain is caused by the outer wall arching, mainly compensating for manufacturing tolerances. If the curvature radius is small, most of the necessary strain for heat transfer is caused by the arching, allowing the guide means to deviate only slightly from parallel, with an angle preferably smaller than 10°, and more preferably smaller than 5°.

In some examples, the outer wall, particularly the contact region of the first cooling medium channel, is elastically deformable, or the first cooling medium channel is resiliently mounted. For instance, the outer wall could comprise a spring steel sheet or have an elastic coating, like a high thermal conductivity graphite foil.

The elastically deformable design of the outer wall of the first cooling medium channel and/or the resilient mounting of the first cooling medium channel are particularly advantageous when the preferably convexly arched outer wall of the first cooling medium channel is not used, or is only used to a minor degree, to cause the strain in the elastocaloric element, but when manufacturing tolerances are to be compensated for by the arching. When the outer wall of the first cooling medium channel is able to resiliently yield, or when the first cooling medium channel is resiliently mounted, the forces that arise during the physical contact between the elastocaloric element and the outer wall of the first cooling medium channel are limited so that no, or only minor, additional strain of the elastocaloric element is caused.

In some examples, the guide means are tracks, particularly roller tracks, and each of the carriages is guided along a guide means by means of a roller.

The tracks, particularly the roller tracks, can comprise a cage.

When the carriages are guided by means of rollers along the guide means, a particularly low-friction displacement of the carriages can be made possible, reducing the driving torque required by the drive device.

Each of the guide means can also comprise two radial bearings, such as grooved ball bearings, or consist thereof.

In some examples, the drive device comprises pitmans (also known as "pitman arms"), such as connecting rods or push rods, wherein each of the carriages is rotatably or rigidly connected to one of the drive pitmans, which are guided along a respective guide means.

The pitmans serve to displace the carriages along the guide means. For this purpose, the carriages are rotatably or rigidly connected to the pitmans. If rollers are provided for guiding the carriages along the guide means, the rollers can also be fastened to the pitmans or to the ends of the pitmans.

When each of the guide means comprises two radial bearings, such as grooved ball bearings, the pitmans can be guided translatorily therein.

In some examples, the guide means and/or the pitmans are rotatably mounted so that an angle between the guide means and/or the pitmans can be set.

Depending on the set angle, the magnitude of the strain of the elastocaloric element caused by the displacement of the carriages along the non-parallel guide means can be adjusted, thereby setting the power of the elastocaloric heat pump.

In some examples, the drive device comprises at least one cam, wherein the pitmans can be moved along the respective guide means by means of the cam.

The cam or the cam lift can thus be translated into a movement of the pitmans.

In the process, a telescoping force transmitting element, such as a rod or plate, can be provided between the cam and the pitman. The force transmitting element is designed to transmit a force from the cam to the pitmans.

In other words, the cam lift is initially transmitted to the force transmitting element by the rotation of the cam. The movement of the force transmitting element generated by the cam lift is then passed on to the pitmans, which displace the carriages along the guide means.

In some examples, the force transmitting element runs on the cam by means of a roller.

The restoring forces that preferably occur during the cyclical displacement of the carriages due to the non-parallel arrangement of the guide means can thus be used to ensure that there is always contact between the cam and the roller.

FIG. 1 shows an elastocaloric heat pump 100 consistent with the present disclosure. The elastocaloric heat pump 100 comprises a plurality of first cooling medium channels 10, which are designed as hot channels 10a. The elastocaloric heat pump 100 further comprises a plurality of second cooling medium channels 11, which are designed as cold channels 11a. A cooling medium, such as water or air, is conducted within each of the first cooling medium channels 10 and the second cooling medium channels 11. The first and second cooling medium channels 10 and 11 are arranged alternately and parallel to one another. A respective elastocaloric element 12 is arranged between a first cooling medium channel 10 and an adjacent second cooling medium channel 11. The elastocaloric elements 12 extend at a right angle transversely to the first cooling medium channels 10 and the second cooling medium channels 11.

The elastocaloric elements 12 are connected to a carriage 13 at each end. The carriages 13 are arranged at two guide means 14 that are not parallel to each other, making them displaceable up and down in the drawing plane. A drive device 15 is provided for the displacement of the carriages 13, which cyclically displaces the carriages 13 along the guide means 14 during operation, so that the elastocaloric elements 12 are alternately brought into thermal contact with a respective outer wall 16 of one of the first cooling medium channels 10 and into thermal contact with an outer wall 17 of one of the second cooling medium channels 11. Due to the non-parallel arrangement of the guide means 14, the elastocaloric elements 12 are cyclically strained. In particular, the elastocaloric elements 12 are strained when in thermal contact with the outer wall 16 of the respective first cooling medium channel 10.

The elastocaloric elements 12 are designed as elastocaloric flat ribbons 18. The first and second cooling medium channels 10 and 11 comprise heat transfer structures 19 in the interior, designed as ribs 20, which favor heat transfer between the material of the cooling medium channels 10, 11 and the cooling medium conducted in the cooling medium channels 10, 11.

The guide means 14 are designed as tracks 21 or roller tracks 22. Each of the carriages 13 is guided by a roller 23 along a respective one of the tracks 21. The drive device 15 comprises pitmans 24. The pitmans 24 are connected at the ends to the carriage 13, particularly in the region of the rollers 23. The pitmans 24 are moved along the tracks 22 approximately up and down in the drawing plane, whereby the carriages 13 are likewise moved along the tracks 21, and each of the elastocaloric elements 12 alternately comes into thermal contact with a first cooling medium channel 10 and a second cooling medium channel 11.

The drive device 15 further comprises a telescoping force transmitting element 25, designed as a telescoping plate 26. The plate 26 comprises a roller 27, which runs on a cam 28 of the drive device 15. As a result of the rotation of the cam 28, the cam lift is transmitted via the roller 27 to the force transmitting element 25, which in turn moves the pitmans 24 along the guide means 14 designed as tracks 21. An angle α between the guide means 14 can be set by means of actuators 29. The guide means 14 are rotatably mounted for this purpose. The larger the angle α between the guide means 14, the greater the strain of the elastocaloric elements 12 arranged between the carriages 13. By setting the angle α, it is possible to adjust the heat output of the elastocaloric heat pump 100. Additional springs 30 in the tracks 21 reduce the driving torque required by the drive device 15 for the operation of the elastocaloric heat pump 100.

Figure 2:
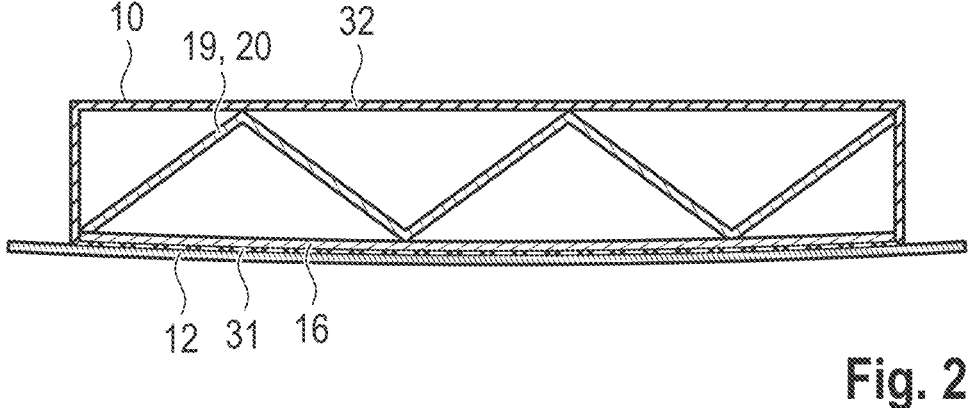
FIG. 2 shows a cooling medium channel having a slightly curved outer wall, according to some aspects of the present disclosure.

FIG. 2 shows a cross-sectional view of a first cooling medium channel 10. An elastocaloric element 12 is in thermal contact with an outer wall 16 of the first cooling medium channel 10. The outer wall 16 provides a contact region 31 for the elastocaloric element 12. The outer wall 16 has a slightly convexly arched design, so that the elastocaloric material 12, when in thermal contact with the outer wall 16, is slightly curved. This curvature compensates for manufacturing tolerances. Additionally, when the elastocaloric element 12 is in thermal contact with the outer wall 16, the curvature allows for additional strain of the elastocaloric element 12. If no additional strain is desired, the outer wall 16 can have a resilient design, at least in the contact region 31. Alternatively, the first cooling medium channels 10 can be resiliently mounted. Outside the contact region 31 of the outer wall 16, the cooling medium channel 10 is provided with thermal insulation 32.

Figure 3:
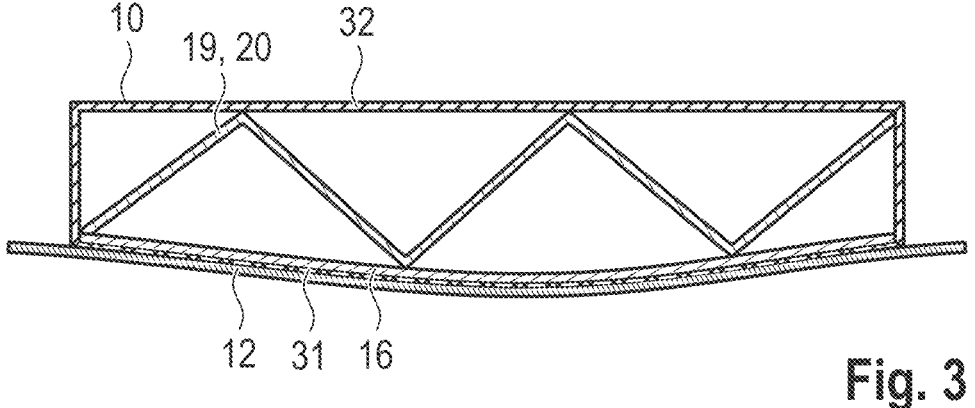
FIG. 3 shows a cooling medium channel having a strongly curved outer wall, according to some aspects of the present disclosure.
Figure 4:
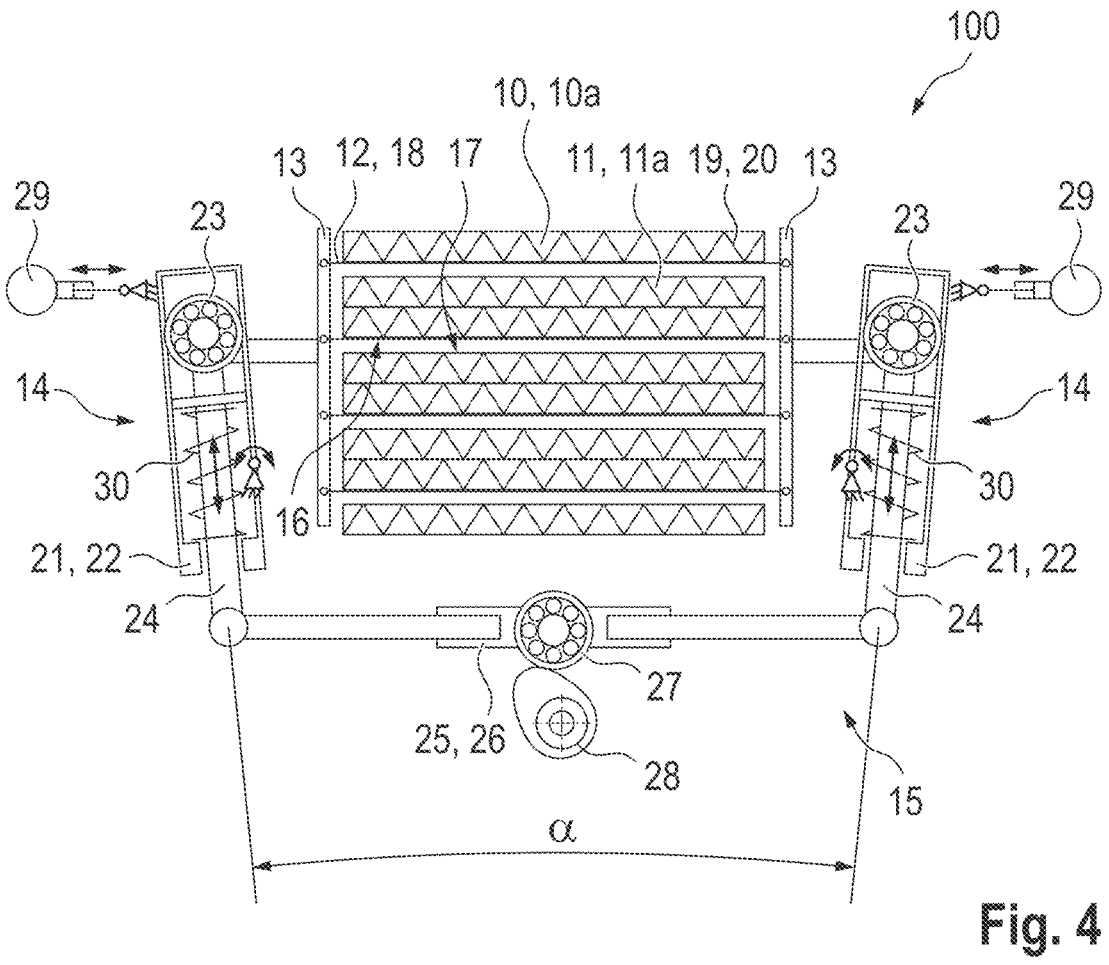
FIG. 4 shows an elastocaloric heat pump, according to some aspects of the present disclosure.

FIG. 3 shows another embodiment of a first cooling medium channel 10. Compared to the cooling medium channel 10 shown in FIG. 2, the outer wall 16 or the contact region 31 of the outer wall 16 for the elastocaloric element 12 is more drastically arched. Due to the stronger arching, the elastocaloric element 12 is more strongly curved when in thermal contact, introducing greater additional strain into the elastocaloric element 12. If the first cooling medium channels 10 are designed according to FIG. 3, most of the strain of the elastocaloric element 12 can be caused by the curvature of the outer wall 16 of the first cooling medium channel 10. In this case, as shown with the elastocaloric heat pump 100 illustrated in FIG. 4, the angle α between the guide means 14 can be selected to be comparatively small, preferably less than 10°, and more preferably less than 5°. This way, only a small portion of the strain of the elastocaloric elements 12 is caused by the non-parallel arrangement of the guide means 14.

Figure 5:
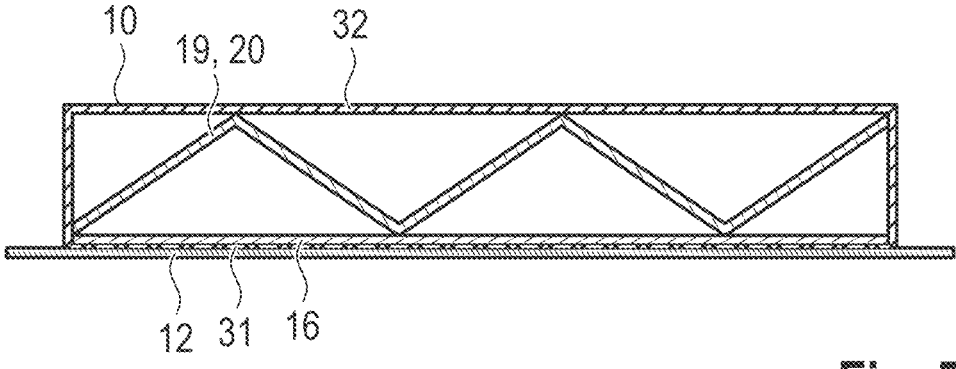
FIG. 5 shows a cooling medium channel having a planar outer wall, according to some aspects of the present disclosure.

FIG. 5 shows another first cooling medium channel 10. The second cooling medium channels 11 can be designed identically to the first cooling medium channel 10 shown in FIG. 5. In contrast to the first cooling medium channels 10 shown in FIGS. 3 and 4, the outer wall 16 or the contact region 31 of the outer wall 16 for the thermal contact with the elastocaloric element 12 has a planar or flat design. This means that no, or only a very small, additional strain is introduced into the elastocaloric element 12 due to the contact of the elastocaloric element 12 with the outer wall 16.

Figure 6:
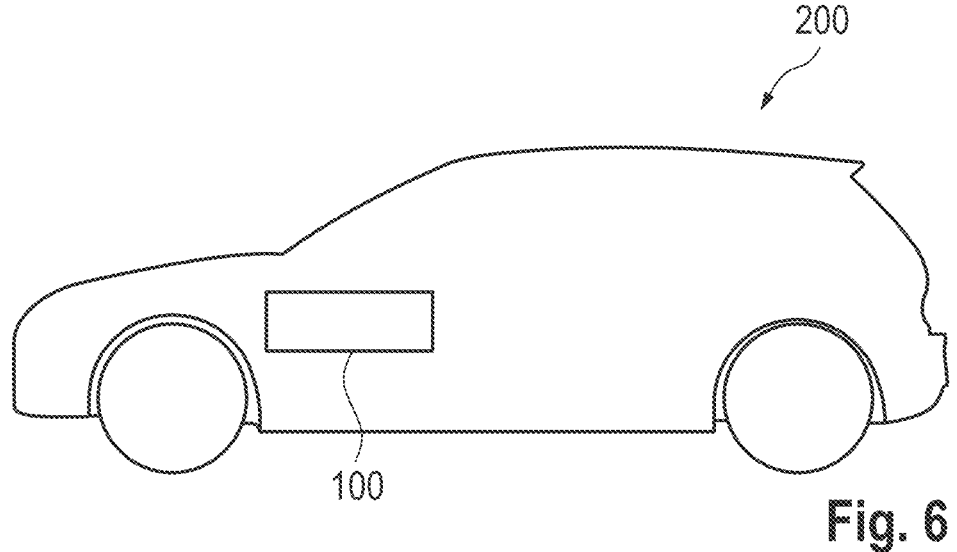
FIG. 6 shows a motor vehicle comprising an elastocaloric heat pump, according to some aspects of the present disclosure.

FIG. 6 shows a motor vehicle 200 comprising an elastocaloric heat pump 100.

LIST OF REFERENCE NUMERALS

100 elastocaloric heat pump
200 motor vehicle
10 first cooling medium channel
10a hot channel
11 second cooling medium channel
11a cold channel
12 elastocaloric element
13 carriage
14 guide means
15 drive device
16 outer wall
17 outer wall
18 elastocaloric flat ribbon
19 heat transfer structure

20 rib
21 track
22 roller track
23 roller
24 pitman
25 force transmitting element
26 plate
27 roller
28 cam
29 actuator
30 spring
31 contact region
32 insulation

The invention claimed is:

1. An elastocaloric heat pump comprising:
at least one first cooling medium channel;
at least one second cooling medium channel;
at least one elastocaloric element; and
a drive device,
wherein the at least one elastocaloric element is arranged between the first cooling medium channel and the second cooling medium channel and connected at each end to a respective carriage, the carriage being displaceably arranged along two guides that are not parallel to one another, and the drive device is configured to cyclically displace the carriage along the two guides so that the at least one elastocaloric element is alternately brought into thermal contact with an outer wall of the first cooling medium channel and an outer wall of the second cooling medium channel.

2. The elastocaloric heat pump of claim 1, wherein the at least one first cooling medium channel comprises a plurality of first cooling medium channels, the at least one second cooling medium channel comprises a plurality of second cooling medium channels, and the at least one elastocaloric element comprises a plurality of elastocaloric elements, wherein each elastocaloric element is positioned between a corresponding first cooling medium channel and a corresponding second cooling medium channel, and is connected at each end to the carriage.

3. The elastocaloric heat pump of claim 1, wherein the at least one elastocaloric element comprises an elastocaloric ribbon or an elastocaloric flat ribbon, and wherein the at least one first cooling medium channel and/or the at least one second cooling medium channel comprises a heat transfer structure.

4. The elastocaloric heat pump of claim 1, wherein the at least one elastocaloric element is configured to be strained when in thermal contact with the outer wall of the at least one first cooling medium channel.

5. The elastocaloric heat pump of claim 1, wherein the at least one elastocaloric element is configured to be at least partly strained during a displacement of the carriage along the two guides that are not parallel to one another.

6. The elastocaloric heat pump of claim 1, wherein the outer wall of the first cooling medium channel has a convex, arched configuration, so that the at least one elastocaloric element is strained by the contact with the outer wall of the first cooling medium channel.

7. The elastocaloric heat pump of claim 1, wherein
the outer wall of the first cooling medium channel is elastically deformable or resilient, and/or
the first cooling medium channel is resiliently mounted.

8. The elastocaloric heat pump of claim 1, wherein the two guides comprise tracks or roller tracks, and wherein the carriage is guided along a track by a roller, and wherein the drive device comprises pitmans, such as connecting rods or push rods, the carriage being rotatably or rigidly connected to one of the pitmans, and the pitman being guided along a respective track.

9. The elastocaloric heat pump of claim 1, wherein the two guides and/or the pitmans are rotatably mounted so that an angle between the two guides and/or the pitmans can be set.

10. A motor vehicle comprising:
an elastocaloric heat pump, wherein the elastocaloric heat pump comprises:
   at least one first cooling medium channel;
   at least one second cooling medium channel;
   at least one elastocaloric element; and
   a drive device,
      wherein the at least one elastocaloric element is arranged between the first cooling medium channel and the second cooling medium channel and connected at each end to a respective carriage, the carriage being displaceably arranged along two guides that are not parallel to one another, and the drive device is configured to cyclically displace the carriage along the two guides so that the at least one elastocaloric element is alternately brought into thermal contact with an outer wall of the first cooling medium channel and an outer wall of the second cooling medium channel.

11. The motor vehicle of claim 10, wherein the at least one first cooling medium channel comprises a plurality of first cooling medium channels, the at least one second cooling medium channel comprises a plurality of second cooling medium channels, and the at least one elastocaloric element comprises a plurality of elastocaloric elements, wherein each elastocaloric element is positioned between a corresponding first cooling medium channel and a corresponding second cooling medium channel, and is connected at each end to a carriage.

12. The motor vehicle of claim 10, wherein the at least one elastocaloric element comprises an elastocaloric ribbon or an elastocaloric flat ribbon, and wherein the at least one first cooling medium channel and/or the at least one second cooling medium channel comprises a heat transfer structure.

13. The motor vehicle of claim 10, wherein the at least one elastocaloric element is configured to be strained when in thermal contact with the outer wall of the at least one first cooling medium channel.

14. The motor vehicle of claim 10, wherein the at least one elastocaloric element is configured to be at least partly strained during a displacement of the carriage along the two guides that are not parallel to one another.

15. The motor vehicle of claim 10, wherein the outer wall of the first cooling medium channel has a convex, arched configuration, so that the at least one elastocaloric element is strained by the contact with the outer wall of the first cooling medium channel.

16. The motor vehicle of claim 10, wherein
the outer wall of the first cooling medium channel is elastically deformable or resilient, and/or
the first cooling medium channel is resiliently mounted.

17. The motor vehicle of claim 10, wherein the two guides comprise tracks or roller tracks, and wherein the carriage is guided along a track by a roller, and wherein the drive device comprises pitmans, such as connecting rods or push rods, the carriage being rotatably or rigidly connected to one of the pitmans, and the pitman being guided along a respective track.

18. The motor vehicle of claim 10, wherein the two guides and/or the pitmans are rotatably mounted so that an angle between the two guides and/or the pitmans can be set.

19. An elastocaloric heat pump comprising:
a first cooling medium channel;
a second cooling medium channel;
at least one elastocaloric element positioned between the first cooling medium channel and the second cooling medium channel; and
a drive mechanism configured to cyclically move the at least one elastocaloric element,
wherein the at least one elastocaloric element is brought into thermal contact with an outer surface of the first cooling medium channel and an outer surface of the second cooling medium channel,
and wherein the at least one elastocaloric element is coupled to a movable support structure, and the drive mechanism is configured to displace the movable support structure along a predetermined path that alternates the thermal contact between the outer surfaces of the first and second cooling medium channels.

20. The elastocaloric heat pump of claim 19, wherein the at least one elastocaloric element comprises an elastocaloric ribbon or an elastocaloric flat ribbon, and wherein the at least one first cooling medium channel and/or the at least one second cooling medium channel comprises a heat transfer structure.

\* \* \* \* \*